United States Patent [19]

Blount

[11] Patent Number: 4,769,437

[45] Date of Patent: Sep. 6, 1988

[54] PROCESS FOR THE PRODUCTION OF PHENOLIC RESINS

[76] Inventor: David H. Blount, 6728 Del Cerro Blvd., San Diego, Calif. 92120

[21] Appl. No.: 106,105

[22] Filed: Sep. 18, 1987

Related U.S. Application Data

[62] Division of Ser. No. 944,960, Dec. 22, 1986, Pat. No. 4,711,911.

[51] Int. Cl.$^4$ .............................................. C08G 59/68
[52] U.S. Cl. ..................................... 528/95; 521/123; 521/180; 528/86; 528/87; 528/167; 528/171; 528/176; 528/211
[58] Field of Search .................... 528/86, 87, 95, 167, 528/171, 176, 211

[56] References Cited

U.S. PATENT DOCUMENTS

| | | | |
|---|---|---|---|
| 2,659,710 | 11/1953 | Martin | 528/104 |
| 2,668,805 | 2/1954 | Greenlee | 528/104 |
| 2,668,807 | 2/1954 | Greenlee | 528/104 |
| 2,779,668 | 1/1957 | Daniels et al. | 528/104 |
| 2,891,026 | 6/1959 | Wasserman | 528/104 |
| 2,945,004 | 7/1960 | Greenlee | 528/104 |
| 4,358,578 | 11/1982 | Brownscombe | 528/104 |
| 4,558,116 | 12/1985 | Wernli et al. | 528/95 |
| 4,711,911 | 12/1987 | Blount | 521/123 |

*Primary Examiner*—Morton Foelak

[57] ABSTRACT

Phenolic resins are produced by reacting a substituted alcohol or epoxy compound with a phenol compound in the presence of an alkali salt-forming compound. The phenolic resin may be utilized as molding material, as a coating agent and as an adhesive.

19 Claims, No Drawings

PROCESS FOR THE PRODUCTION OF PHENOLIC RESINS

This is a divisional application of Ser. No. 944,960 filed Dec. 22, 1986 now U.S. Pat. No. 4,711,911.

BACKGROUND OF THE INVENTION

This invention relates to the production of phenolic resins, solids and foam products by the chemical reaction of a phenolic-type compound and a substituted organic compound containing hydroxyl or epoxy radicals in the presence of an alkali salt-forming compound. The product produced by this invention will be referred to as a phenolic resin.

Productions of phenolic resins are well known in the arts such as phenol-aldehyde, phenol-ketone, phenol-furfuryl alcohol and epoxy-polyhydric phenols. In the production of an epoxy resin utilizing a phenol, it is necessary to use a polyhydric phenol. In the process of this invention, a monohydric phenol is chemically reacted with a substituted organic compound containing a hydroxyl chlorohydrin, etc., in the presence of an alkali salt-forming compound, e.g., sodium hydroxide, thereby producing a novel phenolic resin. This process differs from other known methods because the substituted organic compound with hydroxyl or epoxy radical reacts with the hydroxyl radical of the phenol of one molecule and the benzene ring of another phenol molecule, thereby producing a solid resin. In other processes, the aldehyde and the ketones react with the benzene ring only and in producing epoxy where polyhydric phenols are used, the epichlorohydrin reacts only with the hydroxyl radicals on the phenol molecule.

DESCRIPTION OF THE INVENTION

Phenolic resins, solid and foamed, are produced by the chemical reaction of a phenol-type compound with a substituted organic compound containing hydroxyl radical, epoxy radical, or mixtures thereof, in the presence of an alkali salt-forming compound.

The reactants may be mixed in any suitable proportions, depending upon the product characteristics desired. The reactants may be added in any suitable method, such as mixing all reactants simultaneously or mixing the phenol and substituted organic compound containing hydroxyl radicals or epoxy radicals, then gradually adding the alkali salt-forming compound while agitating or mixing the phenol compound with the alkali salt-forming compound, then slowly adding the substituted organic compound containing hydroxyl or epoxy radical while agitating. The reaction of the invention may take place under any suitable physical condition. While many of the reactions will take place acceptably at ambient temperature and pressures, preferably, the reaction takes place at a temperature between 20° C. and 200° C. On the other hand, where the reaction is exothermic, it may be desirable to cool the reaction vessel, and when a reactant is a gas, elevated pressure may be desirable.

The preferred process of this invention is to add the reactants simultaneously at ambient temperature and pressure while agitating. The reaction is exothermic and in large volumes, it will be necessary to cool the vessel. In certain cases, it is necessary to heat the mixture to complete the reaction at a temperature below the boiling point of the reactants. The pressure may be lower so as to distill off any water produced in the reaction. The reaction is complete within 1 to 12 hours. The salt may be removed by decanting of the resin, by washing out the salt or by dissolving the resin in a solvent.

The exact course of the reactions which take place during the process to produce phenolic resins, solid and foam, cannot be determined with 100 percent certainty. The exact chemical formula for the phenolic resin is not known. The substituted portion of the organic compound reacts with the hydroxyl radical or the phenol molecule and the substituent reacts with the alkali salt-forming compound to produce a salt; the hydroxyl or epoxy radical reacts with the benzene portion of another phenol molecule to produce a phenolic resin, such as illustrated below:

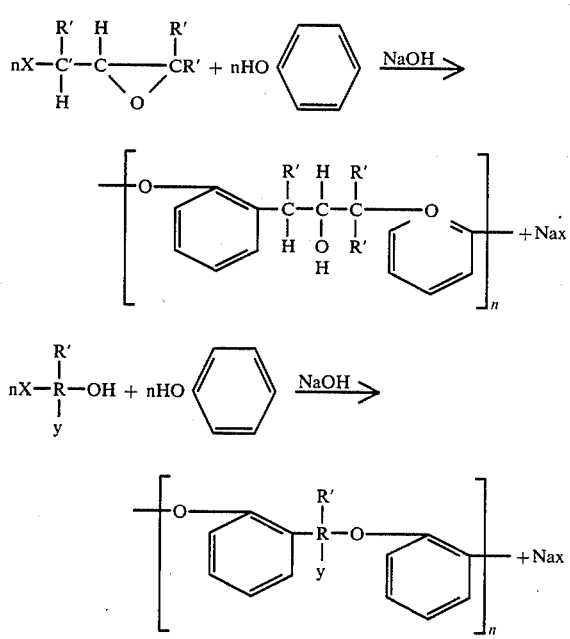

where R' is the same or different organic radical or hydrogen. Preferably, the R groups contain no strong acidic group such as sulphonic acid groups, but any organic group may be used since the R groups are not as important. It is important that substituted radical X in the epoxy compound (epihalohydrin) be in the position indicated. The R groups may, be for example, be $CH_3-$, $C_2H_5-$, $C_3H_2-$, $C_5H_{11}-$, $C_8H_{17}-$, $C_{10}H_{21}-$, phenyl, benzyl, tolyl, xylyl, pyridyl, furyl, etc., may be used in this invention;

where R is carbon or an organic group, saturated or unsaturated, preferably an aliphatic group, where y is an R' or an X;

where X is a halogen, acid sulfate, nitrate, acid phosphate, bicarbonate, formate, acetate, propionate, laurate, oleate, stearate, oxalate, acid malonate, acid tartrate, acid citrate and mixtures thereof;

where n is a number for the amount of mols of reactant utilized; it is preferred that the mols of the reactants, including the alkali compound, e.g., sodium hydroxide, are about equal. There may be an excess of any of the reactants utilized. The amount of mols of the substituted organic compound containing hydroxyl or epoxy radical may vary from 1 to 10 mols and the mols of phenol-type compound may very from 1 to 2 mols. The mols of the alkali salt-forming compound should about equal the mol equivalent of the substituted radical. The phenolic resin may contain free hydroxyl, epoxy and mixtures thereof. Most of the epoxy radicals are converted to hydroxyl radicals.

The preferred method used to produce tough, solid thermoplastic phenolic resin is to mix simultaneously equal mol-equivalents of the reactants, substituted organic compound containing hydroxyl or epoxy radical, phenol-type compound, and alkali salt-forming compound, then agitate the mixture, keeping the temperature between 80° C. to 120° C. for 1 to hours, thereby producing a phenolic resin.

Thermosetting phenolic resin may be produced by utilizing cross-linking compounds, such as adding a different compound, e.g., polyhydric polyols, a chlorohydrin with an epichlorohydrin, aldehydes, etc.

Phenolic resin solid and cellular products are produced by mixing and reacting the following components:

A. Substituted organic compound containing hydroxy radical, epoxy radical, or mixtures thereof, in the amount of 10 to 100 parts by weight.
B. Phenol-type compounds in the amount of 10 to 50 parts by weight.
C. Alkali salt-forming compound in an amount of 1 to 50 parts by weight.

Component A

Any suitable organic compound which contains a substituent that will react with the alkali salt-forming compound and contains a radical that will react with the phenol-type compound may be used in this invention. The substituents can be halogen, acid sulfate, nitrate, acid phosphate, bicarbonate, oxalate, acid malonate, acid tartrate, acid citrate, and others. The substituted organic compound should contain a hydroxyl radical, epoxy radical, or mixtures thereof. Organic compounds containing a halogen radical and an epoxy or hydroxyl radical are preferred, e.g., a polyfuncting halohydrin. Organic halohydrins such as alphadichlorohydrin, dibromohydrin, di-iodohydrin or other halohydrins derived from glycerol in which one terminal hydroxy group is replaced by one or two halogen atoms, e.g., by chlorine, fluorine, bromine or iodine which may react with an alkali group to produce an epihalohydrin, and mixtures thereof, may be used. Ethylene halohydrins, e.g., ethylene chlorohydrin, may be used. Organic esters and ether wherein the hydric portion is substituted with a radical that will react with the alkali salt-forming compound, e.g., dichloroethyl ether, may be used.

Any poly-substituted organic compound which is converted into a substituted organic compound with a hydroxyl radical or an epoxy radical during the course of the reaction of the components in this invention, e.g., ethylene dichloride, undergoes hydrolysis in the presence of sodium carbonate and water. Glyceryl dichlorohydrin is converted to epichlorohydrin in the presence of an alkali metal compound; propylene chlorohydrin is converted to propylene oxide; and ethylene chlorohydrin is converted to ethylene oxide in the presence of an alkali metal compound, hydrolysis of alkyl polyhalides and polymethylene halides with aqueous alkali metal hydroxides and twinned organic dihalides may be hydrolyzed to aldehydes or ketones, polyester compounds, substituted esters when an alcohol portion is substituted; polyester resins, polyvinyl acetate, polyhydroxy organic phosphates, may be used in this invention.

Compounds which contain a substituted and an epoxy radical, e.g., substituted propylene oxide, substituted butylene oxide may be used in this invention.

Compounds which contain a substituent and a hydroxy radical, e.g., ethylene chlorohydrin, substituted methanol, substituted propanol, chlorohydroxy ethylene, substituted ethanol, etc., may be used in this invention.

Substituted organic compounds may contain a hydroxy radical or epoxy radical and have the general formula of:

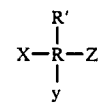

where R is a carbon atom or an organic group, saturated or unsaturated, preferably an aliphatic group;
where R' is the same or different organic radical or hydrogen. Preferably, the R' group may, for example, be $CH_3-$, $C_2H_5-$, $C_3H_7-$, $C_5H_4-$, $C_8H_{17}-$, $C_{10}H_{21}-$, phenyl, benzyl, toyl, xylyl, pyridyl, furyl, etc., and may be used in this invention. R' may also be an X;
where X is halogen, acid sulphate, nitrate, acid phosphate, bicarbonate, formate, acetate propionate, laurate, oleate, stearate, oxalate, acid malonate, acid tartate, acid citrate, phthalate, succinate, adipate, maleate, fumarate, suberate, tetrochlorophthalate and mixtures thereof;
where y is an R' or an X;
Where Z is a hydroxy or an epoxy radical or a substituted radical which, in the course of the reaction of this invention, is converted to a hydroxyl or an epoxy radical.

Any polyfunctional organic compound which contains an epoxy radical and another radical which will react with the alkali salt-forming compound may be utilized in this invention.

Epihalohydrins or any alpha-chloro-beta, gamma epoxy organic compounds, e.g., epichlorohydrin, may be used in this invention.

Any suitable epihalohydrin in compound may be used in this invention, such as epichlorohydrin, epibromohydrin, methyl epichlorohydrin, di-epi-iodohydrin, and mixtures thereof. Epichlorohydrin is the preferred epihalohydrin. Other halogen substituted organic oxides, e.g., tri clorobutylene oxide, may be used. Instead of epichlorohydrin, other compounds of the following general formula:

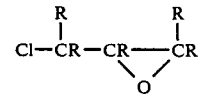

where R is the same or different organic radicals or hydrogen, may be used. Preferably, the R groups contain no strong acidic groups such as sulphonic acid groups, but any organic radicals may be used since the R groups are not important. It is important that the chloro and epoxy groups be in the position indicated. The R groups, for example, $CH_3-$, $C_2H_5-$, $C_3H_7-$, $C_5H_4-$, $C_8H_{17}-$, $C_{10}H_{21}$—, phenyl, benzyl, tolyl, xylyl, pyridyl, furyl, etc., may be used in this invention.

Among some examples are:

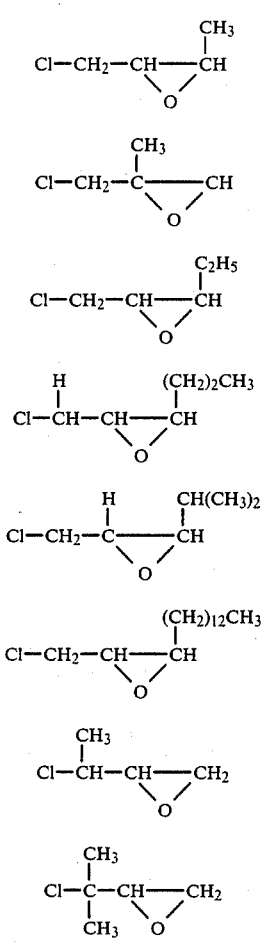

Component B

Any suitable phenol-type compound may be used in this invention. The mono-hydric phenol-type compounds are preferred. The polyhydric phenol-type compounds may be used with the mono-hydric phenol-type compounds. Mono-hydric phenol compounds, e.g., phenol ortho-cresol, meta-cresol, para-cresol, cresylic acid (a mixture of cresols), mono-halogenated phenols, mono-nitrated phenols, mono-sulphonated phenols (phenolsulfonic acids), creosoate, p-tert-butyl phenol, p-tert-amyl phenol, p-phenyl phenol, etc., can be used, but phenol is the preferred phenol-type compound.

Polyhydric phenols such as resorcinol, catechol, hydroquizone, pyrogallol, trihydroxybenzene, phloroglycinol and others may be used with the mono-hydric phenols. Other phenol-derived compounds such as Bisphenol A [2,2-bis 4-(hydroxy phenyl)propane], phenol novalac, triphenylol methane, methylene dianiline, tetra bromo Bisphenol A, aminophenol, and mixtures thereof, may also be used with the phenol-type compound.

Aromatic mono-amines such as aniline, o-toluidine, m-toluidine, methyl aniline, ethyl aniline, etc., may be used in this invention. Anilines react similarly to phenol-type compounds with substituted compounds with hydroxyl or epoxy radical in the presence of an alkali salt-forming compound.

Component C

Any suitable alkali salt-forming compound may be used in this invention. Suitable alkali-forming compounds include, but are not limited to, alkali metal oxides, hydroxide, and salts of weak acids; alkaline earth metal oxides, and hydroxides; ammonia, and mixtures of the above.

Suitable alkali metal compounds such as sodium oxide, sodium hydroxide, potassium oxide, potassium hydroxide, lithium oxide, lithium hydroxide, and mixtures thereof, may be used in this invention.

Suitable alkali metal salts such as sodium carbonate, sodium bicarbonate, potassium carbonate, potassium bicarbonate, sodium acetate, potassium acetate, sodium oxalate, potassium oxalate and others may be used in this invention.

Suitable alkaline earth metal salt-forming compounds such as calcium oxide and calcium hydroxide may be used in this invention.

The preferred alkali salt-forming compound is sodium hydroxide.

Any suitable modifying or additive compounds may be used in the reaction of this invention to vary properties of the phenolic resin. Typical modifying compounds are alcohols, organic acid salts, organic anhydrides, acyl chlorides, aldehydes, ketones, amines, grignard reagents, water, inorganic salts, organic acids, organic sulfur, inorganic acids, sulfur, carbon disulfide, polyols, organic epoxides, polyepoxides, alkali sulfides, sodium polysulfides, aniline, methylene dianiline, Bisphenol A, phenoplast, aminoplast, triphenylol methane, dimer acid, tetrabromo bis A, polyamides, polyimides, polyamines, urea, dicyandiamine, organic acids, allyl chloride, methyl allyl chloride, Lewis acid, Lewis bases, phenoxy resins, fatty or rosin acids, furfural-ketone resins, wood flour, cellulose, wood fibers, lignin acrylics, cynoacrylates, isocyanates, polyisocyanates, polyisocyanate prepolymers, silicones, vinyl monomers, vinyl polymers, diene monomers, diene polymers, vinyl and siene copolymers, carbo xylnitrile-betadiene, rubber, rubber latex, polyester polymer, polyester-polyamide polymers, polyether polymers, vegetable oil, melamine, furan compounds, halogenated aliphatic and aromatic compounds, triallyl cyanurate, polyepichlorohydrin polymers, alkali metal phenols, alkali metal salts of dicarboxyl acids, alkali metal polyhydroxy aliphatic and aromatic compounds, alkali metal salts, poly(acrylic acid) polymers, alkali metal poly(methacrylic acid) polymer, organic esters, phosphate polyols, organic phosphates, organic phosphites, trivalent organo phosphorus, organic metal compounds, cresylic phosphate, hexamethylene tetramine, paraformaldehyde, halogenated aldehydes, silicon halides, silanes, and mixtures thereof.

Various additives, fillers, organic and inorganic foam stabilizers, emulsifiers, flame-retarding agents, plasticizers, stabilizers against against aging and weathering, fungicidal and bacteriosidal substances, dyes, cell regulators and blowing agents may be used in this invention.

Additives may be added to emulsify the mixture, to modify the cells in the cellular solid, to regulate the foaming and to stabilize the cellular solid. The mixture may be emulsified with alkali soaps, metallic soaps, such as zinc stearate and calcium stearates and detergents. The cells in the cellular solid may be modified, regulated and stabilized by additions such as metallic powders, ethyl cellulose, chlorinated natural rubber, polyvinyl acetate, polyvinyl chlorides, metallic oxides and hydroxides, alkylated phenoxy compounds, polyethoxy ethanol, sodium dioctyl sulfosuccinate, dioctyl calcium sulfosuccinate, dioctyl sulfosuccinate, methyl morpholine, diethylethanolamine, polyether siloxanes, and mixtures thereof.

When phenolic resins are utilized as hot-melt adhesive, various additives may be added such as tachifiers, reinforcing agents, viscosity controller, plasticizer, color pigment, fillers, etc.

Various reinforcing agents may be used in this invention. The inorganic and/or organic reinforcing elements may be, e.g., fibers, metal wires, foams, fabrics, fleeces or skeletons. The reinforcing elements may be mixed with the reaction mixture, for example, by the fibrous web impregnation or by processes in which the reaction mixtures and reinforcing fibers are together applied to the molds, for example, by means of a spray apparatus. The shaped products obtained in this way may be used as building elements, e.g., in the form of sandwich elements, either as such or after they have been laminated with metal, glass, plastics, wood or concrete. If desired, these sandwich elements may be foamed. These products may be used as hollow bodies, e.g., as containers for goods which may be required to be moist or cool, as filter materials or exchanges, as catalyst carriers or as carriers of active substances, as decorative elements, furniture components and filling for cavities. They may be used in the field of model building and mold building, and in the production of molds for metal casting, which may also be considered.

Fillers in the form of powders, granules, wire, fibers, dumbbell-shaped particles, crystalites, spirals, rods, beads, hollow beads, foam particles, non-woven webs, pieces of woven or knitted fabrics, tapes and pieces of foil or solid inorganic or organic substances, e.g., dolomite, chalk, alumina, asbestos, basic silicic acids, sand, talc, iron oxide, aluminum oxide and hydroxide, calcium sulfates, alumino silicates, basalt wool or powder, glass fibers, carbon fibers, graphite, carbon black, Al, Fe, Cu and Ag powders, molybdenum sulfide, steel wool, bronze or copper meshes, silicon powder, expanded clay particles, hollow glass beads, glass powder, lava and pumice particles, wood chips, wood meal, cork, cotton, straw, popcorn, coke or particles of filled or unfilled, foamed or unfoamed, stretched or unstretched organic polymers, may be added to the mixture of the components in many applications. Among the numerous organic polymers which may be used, e.g., as powders, granules, foam particles, beads, hollow beads, foamable but not-yet-foamed particles, fibers, tapes, woven fabrics or fleeces, the following may be mentioned as examples: polystyrene, polyethylene, polypropylene, polyacrylonitrite, polybutadiene, polyisoprene, polytetrafluoroethylene, aliphatic and aromatic polyesters, melamine, phenoplasts, aminoplasts, polyacetal resins, polyepoxides, polyhydantoins, polyethers, polyurethane, polyimides, polyamides, polysulphones, polycarbonates and carbonates and mixtures thereof.

The composite materials of the invention may be mixed with considerable quantities of fillers without losing their advantageous properties and, in particular, composite materials which consist predominantly of organic constituents which are, preferably, filled with inorganic fillers.

Blowing agents may be used in this invention. The blowing agents are usually inert liquids with boiling points ranging from $-25°$ to $80°$ C. The organic blowing agents may be, e.g., acetone, ethyl acetate, halogenated alkanes, e.g., methylene chloride, monofluorotrichloromethane, dichlorodifluoromethane, butane, hexane, heptane or diethylether. There are compounds which decompose at temperatures above room temperature with liberation of, e.g., nitrogen. Compressed air, nitrogen or carbon dioxide may also be used as the blowing agent. Steam may be used as the blowing agent. The reaction products of diethylenetriamine and epichlorohydrin, when heated to above $80°$ C., liberate a gas which may be used as the blowing agent.

The novel cellular and solid products produced by this invention have many uses. The reaction mixtures, with a blowing agent, may be mixed in a mixing apparatus; then the reaction mixture may be sprayed by means of compressed air or by the airless spraying process onto surfaces. Subsequently, the mixture expands and hardens in the form of a cellular solid which is useful for insulation, cavity filling and coating. The reaction mixture may also be forced, poured or injected into cold or heated molds, optionally by centrifugal casting, and left to harden at room temperature or at temperatures up to $120°$ C., optionally under pressure. Reinforcing elements may quite easily be incorporated into the reaction mixtures. These products may also be used as cavity fillings, packaging materials, building materials, e.g., light-weight building bricks and panels, having a good solvent resistance, advantageous fire-resistant characteristics, good strength, high dimensional stability to heat and cold, and good sound absorption capacity. The cellular products of this invention may be foamed on the building site, using any hollow forms for foaming. The foams may be crushed and used for propagation of seedlings, cuttings and plants or cut flowers after washing out any salt.

Any suitable compound containing two or more isocyanate radicals may be used to react with the phenolic resins produced by the process of this invention. Suitable organic polyisocyanates include aliphatic, cycloaliphatic, araliphatic, aromatic, heterocyclic polyisocyanates and mixtures thereof. Suitable isocyanates are compounds of the general formula:

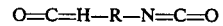

wherein R is a divalent organic radical such as an alkylene, aralkylene or arylene.

Fatty diisocyanates, triphenylmethane-4,4',4"-triisocyanate, polyphenyl-polymethylene polyisocyanate of the kind which may be obtained by anilineformaldehyde condensation followed by phosgenation, perchlorinated arylpolyisocyanates, phosgenated products of arylketone condensates, solutions of residual isocyanates in monomeric polyisocyanates of the type produced in the commercial production of tolylene diisocyanate, diphenyl methane diisocyanate or hexamethylene diisocyanate, modified polyisocyanate, thiopolyisocyanate and mixtures thereof may be used in this invention.

Any suitable polycarboxylic acid or polycarboxylic acid anhydride may be used in this invention to modify the phenolic resin or to react with the phenolic resin to produce phenolic polyester resins.

Suitable polycarboxylic acids include, but are not limited to, succinic acid, adipic acid, suberic acid, azelaic acid, sebacic acid, phthalic acid, isophthalic acid, trimellitic acid, fumaric acid, maleic acid, oxalic acid, dimeric and trimeric fatty acids and mixtures thereof.

Suitable polycarboxylic acid and anhydrides include, but are not limited to, phthalic anhydride, tetrahydrophthalic anhydride, glutaric anhydride, maleic anhydride and mixtures thereof.

The phenolic polyester may be used as coating agents, casting material, further reacted with polyisocyanates, etc.

Any suitable oils, such as drying oils, may be used in this invention to modify the phenolic resin. Suitable oils include, but are not limited to, linseed oil, dehydrated castor oil, soya bean oil, cottonseed oil, tall oil, fish oil, perilla oil, octicica oil, sunflower oil, safflower oil, walnut oil, and mixtures thereof. These modified phenolic resins may be used as coating agents.

The ratio of the essential reactants and optional reactants which lead to the phenolic solid or foamed product of this invention vary, broadly speaking, with ranges as follows:

(a) 10 to 100 parts by weight of Component A (substituted organic compound which contains an hydroxyl or epoxy radical or breaks down in the process to form an hydroxyl or epoxy radical);

(b) 10 to 50 parts by weight of Component B (phenol-type compound);

(c) 1 to 50 parts by weight of Component C (alkali salt-forming compound);

(d) up to 300% by weight, based on weight of Component A, of a modifying compound;

(e) up to 20% by weight, based on weight of Components A, B and C, of a foam stabilizer;

(f) up to 10% by weight, based on weight of Components A, B and C, of an emulsifier;

(g) up to 300% by weight, based on weight of Components A, B and C, of inert filler material;

(h) 1 to 100 parts by weight of an organic isocyanate compound with 2 or more isocyanate radicals reacted with 20 to 50 parts by weight of phenolic resin produced in this invention;

(i) 1 to 100 parts by weight of an organic polycarboxylic acid or anhydride reacted with 20 to 50 parts by weight of phenolic resin produced in this invention;

(j) 1 to 10 parts by weight of polyamine to 2 to 15 parts by weight of an epichlorohydrin;

(k) up to 1% by weight of an organic tin catalyst, percentage based on weight of the reactants, phenolic resin and polyisocyanate.

The object of the present invention is to provide a novel process to produce phenolic resin solid and foam products. Another object is to produce novel solid and foamed products. Another object is to produce novel cellular and solid phenolic resins which are relatively low in cost. Still another object is to produce novel fine cellular products which are relatively low in cost, are rigid, light-weight, high-strength fire-resistant, with good resistance and dimentional stability and are useful for thermal and sound insulation, shock-resistant packaging, as a coating agent, adhesive, casting material, cavity fillers, etc. Another object is to produce solid phenolic resins which may be utilized as a hot-melt adhesive, coating agent, molding powder, casting material, cavity filler, etc.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of phenolic resin products. Parts and percentages are by weight unless otherwise indicated.

EXAMPLE 1

About 60 parts of phenol, 60 parts by weight of epichlorohydrin and 40 parts by weight of caustic soda (NaOH:3½ H$_2$O) are mixed, then agitated, keeping the temperature below the boiling point of the reactants; the reaction is exothermic for about 30 minutes, then the mixture is heated to 80° C. to 120° C. for 1 to 12 hours, thereby producing a solid tan-colored thermoplastic phenolic resin. The resin is washed in hot dilute hydrochloric acid to remove the salt and any unreacted caustic soda. The resin is not water-soluble. The resin softens at about 60° C. and melts at 80° C. to 100° C. It has very good adhesive properties, is flexible, has good tear resistance, and is soluble in phenolic epichlorohydrin, ethylene chlorohydrin and other aromatic solvents.

EXAMPLE 2

About 60 parts by weight of m-cresol, 50 parts by weight of ethylene chlorohydrin and 40 parts by weight of caustic soda are mixed at ambient temperature, then agitated, keeping the temperature below the boiling point of the reactants; increased pressure or temperature may be used. The reaction is exothermic for about 30 minutes, then the temperature is elevated to about 80° C. to 120° C. for 1 to 12 hours. The water may be removed by evaporation at a reduced pressure, thereby producing a solid, tan-colored thermoplastic resin. The melting temperature varies, depending on the length of time the resin has to be heated to continue the condensation of the resin, and ranging from 40° C. to 100° C. It may be used as a molding material.

EXAMPLE 3

About 60 parts by weight of cresylic acid, and 60 parts by weight of epichlorohydrin are mixed, then 40 parts by weight of caustic sodium are slowly added while agitating and keeping the temperature below the boiling point of the reactants. The reaction is exothermic for about 30 minutes, then the mixture is heated to 80° C. to 120° C. for 1 to 12 hours, thereby producing a solid, tan-colored thermoplastic phenolic resin. The resin softens at about 60° C. to 80° C. and is fluid at 80° C. to 100° C. The resin may be ground to a powder and utilized as a molding powder.

EXAMPLE 4

About 60 parts by weight of phenol, 20 parts by weight of ethylene chlorohydrin, 40 parts by weight of epichlorohydrin aud 40 parts by weight of caustic sodium are mixed, then agitated, keeping the temperature below the boiling point of the reactants. The reaction is exothermic for about 30 minutes, then the mixture is heated to 80° C. to 120° C. for 1 to 12 hours, thereby producing a tan-colored, solid phenolic resin. The resin becomes thermosetting on further heating. It may be used as molding material.

EXAMPLE 4

About 60 coats by weight of phenol, 20 parts by weight of ethylene chlorohydrin, 40 parts by weight of epichlorohydrin and 40 parts by weight of caustic sodium are mixed, then agitated, keeping the temperature below the boiling point of the reactants. The reaction is exothermic for about 30 minutes, then the mixture is heated to 80° C. to 120° C. for 1 to 12 hours, thereby producing a tan-colored, solid phenolic resin. The resin becomes thermosetting on further heating. It may be used as molding material.

EXAMPLE 5

About one mol of trichlorobutane oxide, one mol of phenol and one mol of sodium hydroxide are mixed, then agitated while keeping the temperature between 80° C. to 120° C. for 1 to 12 hours, thereby producing a solid brown-colored, thermoplastic phenolic resin.

EXAMPLE 6

About one mol of a substituted compound selected from the lists below, one mol of phenol and one mol of sodium hydroxide (caustic soda) are mixed, then agitated while keeping the temperature between 60' C. to 120° C. for 1 to 12 hours, thereby producing a solid phenolic resin.
(a) propylene chlorohydrin;
(b) ethylene bromohydrin;
(c) glyceryl monoformate;
(d) glyceryl mono-oxalate;
(e) glyceryl monostearate;
(f) glyceryl monoacetate;
(g) alpha dichlorohydren;
(h) cellulose acetate;
(i) pentabromodiphenyl oxide;
(j) tetrabromophalate diol;
(k) decabromodiphenyl oxide;
(l) 2,3-dibromopropanol;
(m) chloropropyl phosphate ester;
(n) polyether phosphate polyol (VIRCOL 82 produced by Mobil);
(o) 3 mols of propylene glycol reacted with one mol of phosphoric acid;
(p) aromatic polyester polyol (TERATE 202 by Hercules, Inc.);
(q) nitrocellulose;
(r) nitrobutanol;
(s) dibromopropyl alcohol;
(t) dichlorodiethyl ether;
(u) polyvinyl acetate emulsion;
(v) mixtures thereof.

EXAMPLE 7

EXAMPLE one is modified wherein 10 parts by weight of resorcinal are used in place of 10 parts by weight of phenol and used with the phenol, thereby producing a phenolic epoxy resin.

EXAMPLE 8

EXAMPLE one is modified wherein 10 parts by weight of creosote are used in place of 10 parts by weight of phenol and used with the phenol, thereby producing a phenolic resin.

EXAMPLE 9

About 25 parts by weight of resorcinol, 25 parts by weight of phenol, 60 parts by weight of epichlorohydrin and 40 parts by weight of caustic soda (NaOH) are mixed, then agitated while keeping the temperature below the boiling point of the reactants. The reaction is exothermic for about 30 minutes. The temperature is kept between 80° C. to 120° C. for 1 to 12 hours, thereby producing a thick liquid phenolic resin.

EXAMPLE 10

About 30 parts by weight of phenol novolac resin, 25 parts by weight of phenol, 60 parts by weight of epichlorohydrin and 40 parts by weight of caustic soda (NaOH) are mixed, then agitated while keeping the temperature below the boiling point of the reactants. The reaction is exothermic for about 30 minutes. The temperature is kept between 80° C. to 120° C. for 1 to 12 hours, thereby producing a liquid phenolic resin.

EXAMPLE 11

Example 2 is modified wherein 10 parts by weight of Bisphenol A are substituted for 10 parts by weight of cresylic acid and used with the cresylic acid, thereby producing a phenolic compound.

EXAMPLE 12

About 50 parts by weight of phenol, 10 parts by weight of a polyether diol or glycol, selected from the list below, 60 parts by weight of epichlorohydrin, and 40 parts by weight of caustic soda (NaOH) are mixed, then agitated, keeping the temperature below the boiling point of the reactants. The reaction is exothermic for about 30 minutes, then the mixture is kept at a temperature of 80° C. to 120° C. for 1 to 12 hours, thereby producing a phenolic compound.
(a) ethylene glycol;
(b) propylene glycol;
(c) dipropylene glycol;
(d) diethylene glycol;
(e) polyethylene diol;
(f) polypropylene diol;
(g) butane diol;
(h) triethylene glycol;
(i) tetraethylene glycol;
(j) hexane 1,6-diol;
(k) dibutylene glycol;
(l) trichloro-1,1-dihydroxy ethane;
(m) mixture of the above.

EXAMPLE 13

EXAMPLE 12 is modified wherein another organic polyol is used in place of the organic diol and is selected from the list below:
(a) glycerol;
(b) trimethylol propane;
(c) sucrose;
(d) carbohydrates;
(e) starch;
(f) castor oil;
(g) cellulose;
(h) butane-1,2,4-triol;
(i) glucose;
(j) castor oil (triol);
(k) pentaerythritol;
(l) polyester polyol;
(m) polypropylene triol, 1000 molecular weight;
(n) polyethylene triol, 1500 molecular weight.

EXAMPLE 14

About 10 parts by weight of phenol and 20 parts by weight of epichlorohydrin are mixed, then 10 parts by weight of caustic soda (NaOH) are slowly added while agitating and the temperature is kept between 80° C. and 120° C. for about 1 to 12 hours. A tan solid phenolic resin is produced which is thermosetting.

EXAMPLE 15

About 10 parts by weight of phenol, 20 parts by weight of epichlorohydrin and 5 parts by weight of an alkali salt-forming compound, selected from the group below, are mixed and then agitated while keeping the temperature below the boiling point of the reactants for 1 to 12 hours, thereby producing a liquid phenolic resin with free epoxy radicals and hydroxyl radicals. The resin may be reacted with polyisocyanates to produce foam products.
- (a) caustic soda (NaOH·3½H$_2$O);
- (b) sodium carbonate (Na$_2$CO$_3$·10 H$_2$O);
- (c) sodium bicarbonate;
- (d) potassium hydroxide;
- (e) potassium carbonate (K$_2$CO$_3$·3H$_2$O);
- (f) calcium hydroxide;
- (g) cadmium hydroxide.

EXAMPLE 16

Example 15 is modified wherein 10 parts by weight of the alkali salt-forming compound are used in place of 5 parts by weight of the alkali salt-forming compound, thereby producing a liquid phenolic resin with free epoxy and hydroxyl radicals.

EXAMPLE 17

About 20 parts by weight of cresylic acid and 15 parts by weight of caustic soda are mixed and reacted. Then this mixture is slowly added to 40 parts by weight of epichlorohydrin while agitating and keeping the temperature between 50° C. to 80° C. for about 1 hour, thereby producing a liquid phenolic resin with free epoxy and hydroxyl radicals. This resin may be used for the polyol in production of polyurethane foams and resins.

EXAMPLE 18

EXAMPLE 17 is modified wherein 20 parts by weight of an organic compound, selected from the list below, are added with the components, thereby producing a modified phenolic resin.
- (a) ethylene chlorohydrin;
- (b) propylene chlorohydrin;
- (c) methacrylic acid;
- (d) acrylic acid;
- (e) oxalic acid;
- (f) phthalic anhydride;
- (g) maelic acid;
- (h) sodium adipate;
- (i) potassium succinate;
- (j) sulfur;
- (k) sodium polysulfide;
- (l) methyl mercaptan;
- (m) vinyl acetate;
- (n) acrylonitrile;
- (o) acetaldehyde;
- (p) acrolein;
- (q) allyl chloride;
- (r) melamine;
- (s) aniline;
- (t) phenylenediamine;
- (u) ethylene dichloride;
- (v) castor oil;
- (w) disodium diethyl silane;
- (x) cresyl phosphate.

EXAMPLE 19

About 10 parts by weight of phenol, 5 parts by weight of a polyfunction phenol-type compound, selected from the list below, were mixed and 20 parts by weight of epichlorohydrin and 10 parts by weight of caustic soda granules were slowly added while agitating and keeping the temperature at 80° C. to 120° C. for 1 to 12 hours, thereby producing a thermosetting phenolic resin.
- (a) resorcinol;
- (b) Bisphenol A;
- (c) Phenol novolac;
- (d) triphenylol methane;
- (e) methylene dianiline;
- (f) P-aminophenol;
- (g) tetrabromo bis A;
- (h) trihydroxybenzene;
- (i) mixtures thereof.

EXAMPLE 20

EXAMPLE 1 is modified wherein the phenolic resin is washed in hot dilute acid or metal chloride, selected from the list below, thereby removing the salt and lowering the pH.
- (a) hydrochloric acid;
- (b) sulfuric acid;
- (c) nitric acid;
- (d) acetic acid;
- (e) magnesium chloride;
- (f) aluminum chloride.

EXAMPLE 21

EXAMPLE 1 is modified when 5 parts by weight of an aldehyde, selected from one group below, are mixed into the melted phenolic resin produced in EXAMPLE 1, thereby producing a modified phenolic resin.
- (a) formaldehyde;
- (b) acetaldehyde;
- (c) butyraldahyde;
- (d) chloral;
- (e) acrolein;
- (f) furfural;
- (g) hexamethylene tetramine;
- (h) paraformaldehyde;
- (i) mixtures thereof.

EXAMPLE 22

About 40 parts by weight of phenol, 60 parts by weight of epichlorohydrin, 20 parts by weight of an oil, selected from the list below, and 30 parts by weight of caustic soda are mixed, then agitated while keeping the temperature below the boiling point of the reactants for 1 to 12 hours, thereby producing a modified phenolic resin. This resin may be used as a coating agent.
- (a) linseed oil;
- (b) dehydrated castor oil;
- (c) soya bean oil;
- (d) cottonseed oil;
- (e) tall oil;
- (f) tuna oil;
- (g) fish oil;
- (h) perilla oil;

(i) oiticica;
(j) sunflower oil;
(k) safflower oil;
(l) walnut oil;
(m) mixtures of the above.

EXAMPLE 23

About 100 parts by weight of the phenolic resin particles produced in EXAMPLE 2 are mixed with 25 parts by weight of a filler, listed below, then heated to melt the resin and then pressed in a mold under pressure, thereby producing a molded phenolic resin product.
(a) wood flour;
(b) wood fibers;
(c) carbon fibers;
(d) glass fibers;
(e) asbestos;
(f) mica;
(g) diatomaceous earth;
(h) silica powder;
(i) metal fiber;
(j) graphite;
(k) metal powder;
(l) metal oxide;
(m) cotton;
(n) plastic fibers;
(o) lignin;
(p) proteinaceous material;
(q) mixtures thereof.

EXAMPLE 24

About equal parts by weight of the phenolic resin produced in EXAMPLE 17 and a polyisocyanate compound, selected from the list below, were mixed and reacted, thereby producing a foamed polyurethane product.
(a) toluene-2,4- and -2,6-diisocyanate;
(b) polyphenyl-polymethylene-isocyanates, obtained by aniline-formaldehyde condensation followed by phosgenation;
(c) hexamethylene diisocyanate;
(d) diphenyl methane diisocyanate;
(e) prepolymer produced by reacting 2 mols of TDI with 1 mol of propylene glycol;
(f) phenylene diisocyanate;
(g) chlorophenylene diisocyanate;
(h) m-xylylene diisocyanate;
(i) naphthylene diisocyanate;
(j) tetramethylene diisocyanate;
(k) thiodipropyl diisocyanate.

EXAMPLE 25

EXAMPLE 24 is modified wherein up to 20% by weight of a foam stabilizer, up to 1% by weight of an organo-tin catalyst, up to 10% by weight of an amine catalyst; up to 50% by weoght of a blowing agent, and up to 10% by weight of a surfactant are added to the fluid mixture of EXAMPLE 24. Percentages are based on the weight of the reactants.

EXAMPLE 26

EXAMPLE 1 is modified by adding 20 parts by weight of a polycarboxylic organic acid or anhydride, selected from the list below, to 100 parts by weight of the melted phenolic resin produced in EXAMPLE 1. Continue heating at 80° C. to 120° C. for 1 to 12 hours, thereby producing a modified phenolic resin.
(a) succinic acid;
(b) adipic acid;
(c) suberic acid;
(d) azelaic acid;
(e) sebacic acid;
(f) phthalic acid;
(g) isophthalic acid;
(h) trimellitic acid;
(i) fumaric acid;
(j) malaeic acid;
(k) oxalic acid;
(l) phthalic anhydride;
(m) tetrahydrophthalic anhydride;
(n) tetrachlorophyhslic anhydride;
(o) glutaric anhydride;
(p) maleic anhydride;
(q) dimeric and trimeric fatty acids;
(r) and mixtures thereof.

EXAMPLE 27

EXAMPLE 1 is modified wherein the melted solid phenolic resin is mixed with blowing agent in an amount up to 50% by weight of the resin while in a closed system under pressure. Then the mixture is released from the closed system and allowed to expand and cool, thereby producing a rigid cellular phenolic resin product.
(a) compressed air;
(b) nitrogen;
(c) freon, e.g., trichloromonofluoromethane;
(d) propane;
(e) methane;
(f) azoisobutyric acid nitrile;
(g) carbon dioxide;
(h) acetone;
(i) methanol;
(j) ethane;
(k) halogenated alkanes;
(l) butane;
(m) diethylenetriamine-epichlorohydrin condensation product that released a gas on heating;
(n) hexane;
(o) diethylether;
(p) mixtures of the above.

EXAMPLE 28

About 100 parts by weight of the powdered phenolic resin produced in EXAMPLE 2 and up to 10 parts by weight of a compound that is decomposed by heat and releases a gas, such as azoisobutyric acidnitrile, are mixed, then placed in a mold and then heated to about 120° C., thereby expanding the phenolic resin into a cellular product.

EXAMPLE 29

Powdered phenolic resin as produced in EXAMPLE 1 is mixed with powdered methylene-p-phenylene diisocyanate in the ratio of 2:1 by weight, then heated to the melting point of the phenolic resin. The mixture expands into a solid cellular product which may be used for thermal and sound insulation.

Although specific conditions and ingredients have been described in conjunction with the above examples of preferred embodiments, these may be varied and other reagents and additives may be used where suitable, as described above, with similar results.

Other modifications and applications of the invention will occur to those skilled in the art upon reading this disclosure. These are intended to be included within the scope of this invention as defined in the appended claims.

I claim:

1. The process for the production of phenolic resin by mixing and reacting the following components:
   (A) substituted organic compound which contains a hydroxyl radical or an epoxy radical and the substituent selected from the group consisting of halogens, acid sulfate, nitrate, acid phosphate, bicarbonate, formate, acetate, propionate, laurate, oleate, stearate, oxalate, acid malonate, acid tartrate, acid citrate, and mixtures thereof, in the amount of 10 to 100 parts by weight;
   (B) monohydric phenol compound in the amount of 10 to 50 parts by weight;
   (C) alkali salt-forming compound in the amount of 1 to 50 parts by weight.

2. The product produced by the process of claim 1.

3. The process of claim 1 wherein up to 300% by weight of a modifying compound, based on the weight of Component A of claim 1, is added to the components.

4. The product produced by the process of claim 3.

5. The process of claim 1 wherein up to 10% by weight of an emulsifier, based on the weight of Components A, B and C of claim 1, is added to the components.

6. The process of claim 1 wherein up to 300% by weight of inert filler material, based on the weight of Components A, B and C of claim 1, is added to the components.

7. The process of claim 1 wherein the substituted organic compound of hydroxyl radical has the general formula of:

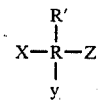

where R is a carbon atom or an organic group, saturated or unsaturated;

where R' is the same or different organic group or hydrogen and the organic group is selected from the group consisting of CH$_3$—, C$_2$H$_5$—, C$_3$H$_7$—, C$_5$H$_{11}$—, C$_8$H$_{17}$—, C$_{10}$H$_{21}$—, phenyl, benzyl, toyl, xylyl, pyridyl, furyl and an X;

where X is selected from the group consisting of halogen, acid sulfate, nitrate, acid phosphate, bicarbonate, formate, acetate, propionate, laurate, oleate, stearate, oxalate, acid malonate, acid tartrate, acid citrate, phthalate, succinate, adipate, malerate, fumarate, suberate, tetrachlorophthalate and mixtures thereof;

where y is an R' or an X;

where Z is a hydroxyl or epoxy radical.

8. The process of claim 1 wherein the substituted organic compound which contains an epoxy radical has the general formula:

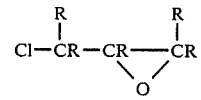

where R is the same or different organic radicals or hydrogen and the R groups are selected from the group consisting of CH$_3$—, C$_2$H$_5$—, C$_3$H$_7$—, C$_5$H$_{11}$—, C$_8$H$_{17}$—, C$_{10}$H$_{21}$—, phenyl, benzyl, tolyl, xylyl, pyridyl, and furyl.

9. The process of claim 1 wherein the monohydric phenol compound is selected from the group consisting of phenol, ortho-cresol, metal cresol, para-cresol, mono-halogenated phenol, mono-nitrated phenol, mono-sulfonated phenol, aminophenol, cresoate, p-tert-butyl phenol, p-tert-amyl phenol; p-phenyl phenol and mixtures thereof.

10. The process of claim 1 wherein the alkali salt-forming compound is selected from the group consisting of alkali metal oxides, alkali metal hydroxide, alkali metal carbonate, alkaline earth metal oxides, alkaline earth metal hydroxide and mixtures thereof.

11. The process of claim 1 wherein 1 to 100 parts by weight of an organic compound containing 2 or more isocyanate radicals are mixed and reacted with 20 to 50 parts by weight of the phenolic resin, thereby producing a polyurethane product.

12. The process of claim 1 wherein an organic polycarboxylic acid compound, organic polycarboxylic acid anhydride, or mixtures thereof, in the amount of 1 to 100 parts by weight, are mixed and reacted with 20 to 50 parts by weight of the phenolic resin produced in claim 1, thereby producing a phenolic polyester resin.

13. The product produced by the process of claim 11.

14. The product produced by the process of claim 12.

15. The process of claim 1 wherein 1 to 100 parts by weight of a polyamine compound are mixed and reacted with 20 to 50 parts by weight of the phenolic resin produced in claim 1.

16. The product produced by the process of claim 15.

17. The process of claim 1 wherein up to 300% by weight of an oil selected from the group consisting of linseed oil, dehydrated castor oil, soya bean oil, cottonseed oil, tall oil, tung oil, fish oil, sunflower oil, safflower oil, and mixtures thereof, are added to the components of claim 1.

18. The product produced by the process of claim 17.

19. The process of claim 1 wherein Component A is a polysubstituted organic compound which is reduced by the process of claim 1 into a substituted organic compound which contains an hydroxy or epoxy radical.

* * * * *